(12) United States Patent
Choi et al.

(10) Patent No.: US 6,699,371 B2
(45) Date of Patent: Mar. 2, 2004

(54) FABRICATION METHOD OF BLUE LIGHT EMITTING ZNO THIN FILM PHOSPHOR

(75) Inventors: Won Kook Choi, Seoul (KR); Hyung Jin Jung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/988,603

(22) Filed: Nov. 20, 2001

(65) Prior Publication Data

US 2003/0052318 A1 Mar. 20, 2003

(30) Foreign Application Priority Data

Sep. 20, 2001 (KR) ......................... 2001-58189

(51) Int. Cl.$^7$ .................. C23C 14/34; C23C 16/40; B05D 3/02
(52) U.S. Cl. ............... 204/192.15; 427/248.1; 427/255.19; 427/372.2; 427/377
(58) Field of Search ............... 204/192.15, 192.22; 427/248.1, 255.19, 372.2, 377

(56) References Cited

U.S. PATENT DOCUMENTS 5,304,889 A * 4/1994 Tono et al. .................. 313/467
5,965,192 A * 10/1999 Potter .......................... 427/64
6,217,795 B1 * 4/2001 Yu et al. ............... 252/301.6 R
6,254,805 B1 * 7/2001 Potter .................. 252/301.4 R
6,322,725 B1 * 11/2001 Yu et al. ............... 252/301.6 R

OTHER PUBLICATIONS

Takashi Sekiguchi et al., "Effect of Hydrogenation on ZnO Luminescence", Jpn. J. Appl. Phys., vol. 36, pp. L289–L291 (1997).
Robert J. Langley et al., "Blue Cathodoluminescence form Tantalum Zinc Oxide", IEEE, pp. 161–164 (1997).
Jassleen Bombra Sobti et al., Mat. Res. Soc. Symp. Proc. vol. 560, 89–93, 1999.

* cited by examiner

Primary Examiner—Steven H. VerSteeg
(74) Attorney, Agent, or Firm—Greenblum & Bernstein, P.L.C.

(57) ABSTRACT

Substrate that is vapor-deposited with dopant-added ZnO thin film is loaded into a heat-treating chamber, and heat-treated quickly under gas atmosphere to activate the dopant. A thin film phosphor having new luminescence peak can be fabricated by quick-heat-treatment of zinc compound semiconductor under hydrogen atmosphere. This thin film phosphor can replace the conventional blue luminescence using alloy-type ZnO and furthermore can be utilized as blue light emitting material for flat plate display elements such as FED and PDP.

8 Claims, 4 Drawing Sheets

FABRICATION METHOD OF BLUE LIGHT EMITTING ZNO THIN FILM PHOSPHOR

BACKGROUND OF THE INVENTION

1. Field of the Invention

The present invention relates to a fabrication method of blue light emitting ZnO thin film phosphor. More particularly, the invention relates to a fabrication method of blue light emitting ZnO thin film phosphor simply by heat treatment without making Al-added alloy.

2. Description of the Related Art

Previously research on the phosphor over visible light range has been performed for compound semiconductors such as ZnS, ZnSe, ZnO, and so forth. However, due to the native defects of nonstoichiometry of this research, the emission characteristic has been limited to red and green series.

Meanwhile, the blue light emitting phosphors have emerged recently to be important for accomplishing full color representation in the flat panel display (FPD) field.

Among these blue light-emitting phosphors, ZnO has known to be green light emitting by interstitial Zn and O vacancy.

Up to the present, ZnS:Ag and Zn gallate ($ZnGa_2O_4$) have generally been used as major blue phosphors.

For the case of phosphors using ZnO, alloy-type powder such as $ZnGa_2O_4$ or thin film type phosphor has been developed.

For the case of blue light emitting phosphors using ZnO besides $ZnGa_2O_4$, cathode luminescence of $Ta_2Zn_3O_8$ and $ZnWO_4$, which has luminescence peaks at 410~417 nm and 490 nm, respectively, has been developed by making alloys of Ta and W. [Refer to *University/Government/Industry Microelectronics Symposium, 1997, Proceedings of Twelfth Biennial,* IEEE, P. 161 and *Mat. Res. Soc. Symp. Proc.,* v. 560, 89 (1999)]

SUMMARY OF THE INVENTION

It is an object of the present invention to provide blue light emitting ZnO thin film phosphor by vapor-depositing through sputtering and heat-treating slightly doped targets without the conventional alloying process in which the phosphors using ZnO form spinel structure as in $WO_3$, $Ta_2O_5$, and $Ga_2O_3$.

To achieve the aforementioned object, the present invention is characterized by loading a substrate that is vapor-deposited with dopant-added ZnO thin film into a heat-treating chamber, and heat-treating it quickly under gas atmosphere to activate the dopant.

The above and other features and advantages of the present invention will be more clearly understood for those skilled in the art from the following detailed description taken in conjunction with the accompanying drawings, which form parts of this disclosure.

DETAILED DESCRIPTION OF THE EMBODIMENT

Hereinafter, the present invention is described trough embodiments in detail by referring to the accompanying drawings.

First of all, ZnO thin film that is added with a small dose of chemical impurity, i.e., dopant, for semiconductor doping is vapor-deposited on substrate composed of silicon (Si) or sapphire single crystal.

Here, the dopant is selected from the group of aluminum (Al), indium (In), and gallium (Ga) or contains some of this group as constituent elements.

Next, the substrate vapor-deposited with the ZnO thin film that is doped with the aforementioned dopant is loaded into a heat-treatment chamber and heat-treated quickly under atmosphere of various sorts of gases.

The temperature inside the heat-treatment chamber is increased at a ate of 1~100° C./second, and when the temperature reaches about 600~4000° C., heat-treatment is performed for 3 seconds to 20 minutes at that temperature.

The first embodiment of the present invention uses ZnO thin film doped with 1~3%, preferably 2%, weight content of aluminum oxide (Al2O3) as a target, and forms n-type zinc oxide thin film (hereinafter called 'AZO') by using RF magnetron sputtering method varying the temperature of sapphire (001) substrate from the room temperature to 700° C.

Figure 1:
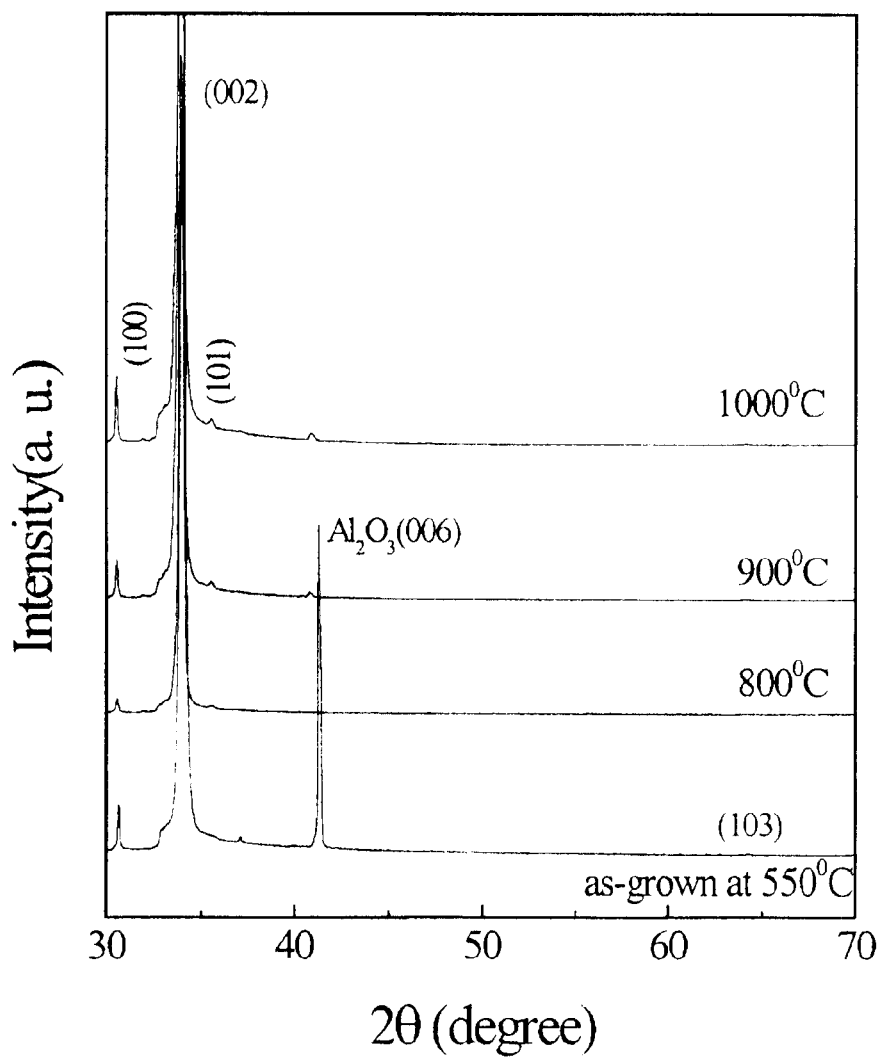
FIG. 1 shows spectra of x-ray diffraction pattern of zinc oxide thin film vapor-deposited at 550° C. and that undergone quick heat treatment under nitrogen atmosphere at 800~1000° C. according to the first embodiment.

FIG. 1 shows spectra of an x-ray diffraction pattern of AZO that is fabricated by the first embodiment, in which RF power of 120W is applied to the ZnO target doped to 2-inches depth with Al2O3 under the condition that the temperature of the substrate is kept at 550° C. and plasma gas is composed of argon and oxygen with a 1:1 ratio, and then quick heat treatment is performed at 800~1000° C. for 3 minutes.

As shown in FIG. 1, AZO vapor-deposited at 550° C. has grown poly crystalline with an orientation layer of ZnO(002) and the polycrystallinity is maintained even after the quick heat-treatments at 800° C., 900° C., and 1000° C.

In the second embodiment, the sample prepared in the first embodiment is loaded into a heat-treatment chamber maintained under hydrogen atmosphere, and then the temperature in the chamber is increased up to 600~1000° C. at a rate of 50~100° C./second and kept for 3 to 20 minutes at that temperature.

Figure 2:
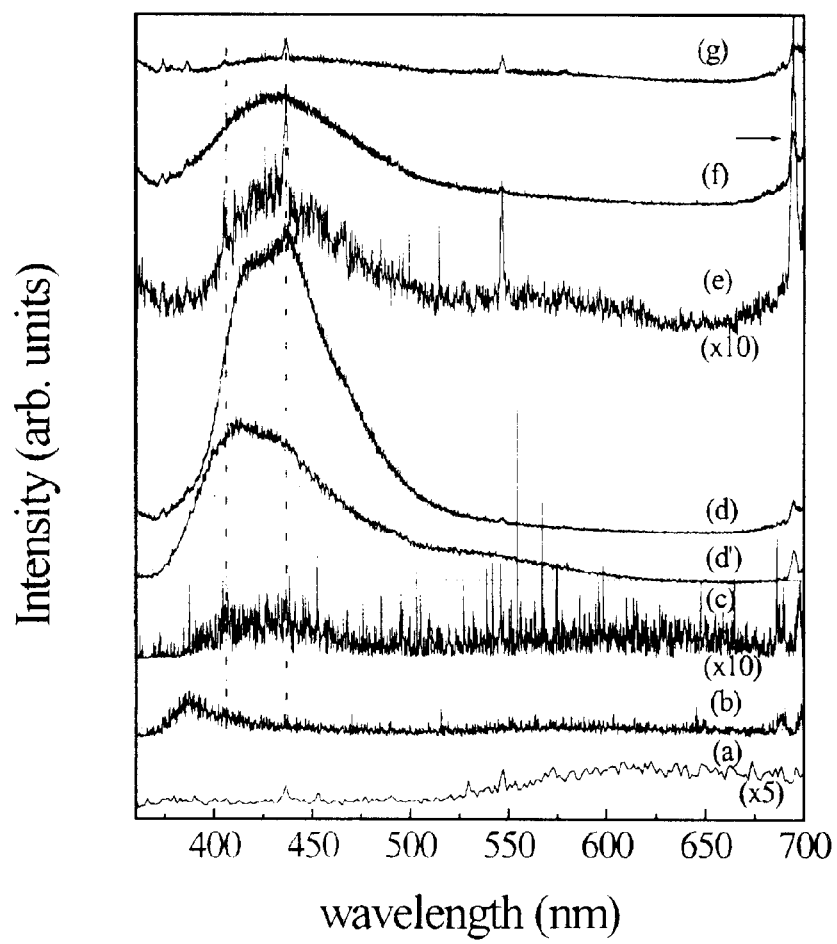
FIG. 2 shows spectra of luminescent characteristic of zinc oxide thin film vapor-deposited at 550° C. and that undergone quick heat treatment at 600~1000° C. according to the second embodiment.

FIG. 2 shows the measurement results of luminescent characteristic of zinc oxide treated under hydrogen atmosphere according to the second embodiment. Here, the spectra was measured by photoluminescence (PL) method.

As shown in the figure, for Case (a) of AZO vapor-deposited at 550° C., no conspicuous photoluminescence (PL) peak is found but a broad deep-level emission over 500~650 nm is observed.

For Case (b) of AZO heat-treated quickly at 600° C. for 3 minutes under hydrogen atmosphere, new PL peaks begin to appear at 382 nm (3.2 eV) and 406 nm (3.05 eV) over the broad deep-level emission range.

It is known that the peak at 3.2 eV is caused by the passivation of the defect level of hydrogen. [Refer to T. Segiguchi, N. Ohashi, and Y. Terada, *Jap. J. Appl. Phys.,* 36, L289 (1997).] However, the cause of blue light emission at 3.05 eV is unknown, yet.

For Case (c) of AZO heat-treated quickly at 750° C. for 3 minutes under hydrogen atmosphere, band-edge emission around 3.2 eV disappears but PL peaks begin to appear around 406 nm and 436 nm. And for Case (d) where heat-treatment at 750° C. is extended for 10 minutes, the PL peak around 436 nm (2.84 eV) shows a large intensity increase.

However, for Case (d') where it is treated by $CHCl_3$, it is observed that the peak at 436 nm decreases and deep-level peaks are enhanced again.

On the other hand, in Cases (e) and (f) of heat-treatment at 800~900° C. for 3 minutes the blue light emission peak diminishes gradually; and in Case (g) at 1000° C., the peak disappears.

In other words, Cases (f) and (g) of FIG. 2 show that when AZO is heat-treated for 3 minutes at varied temperature, blue light emission is observed up to 900° C. but with much smaller intensity compared to that at 750° C. and disappears at 1000° C.

Therefore, if ZnO thin film is heat-treated at the temperature range of 750~900° C. under hydrogen atmosphere, blue light emission can be observed from AZO.

FIG. 3 is a micropicture by scanning electron microscopy of AZO treated according to the second embodiment.

Figure 3A:
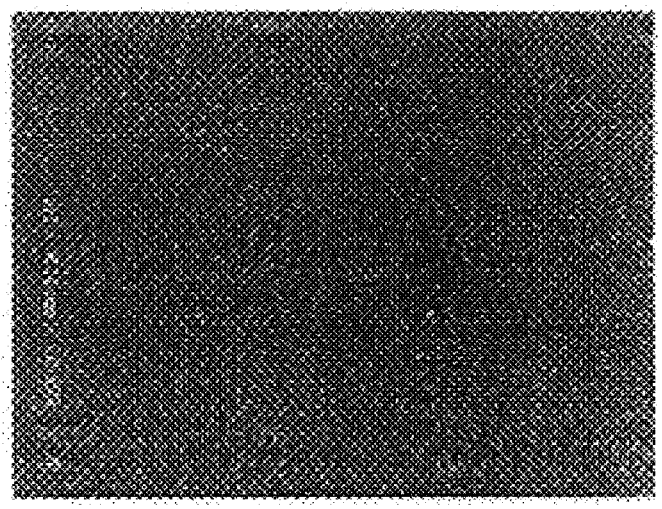
FIGS. 3a to 3d show surface microstructure of zinc oxide thin film vapor-deposited at 550° and that undergone quick heat treatment at 600~1000° according to the second embodiment.
Figure 3B:
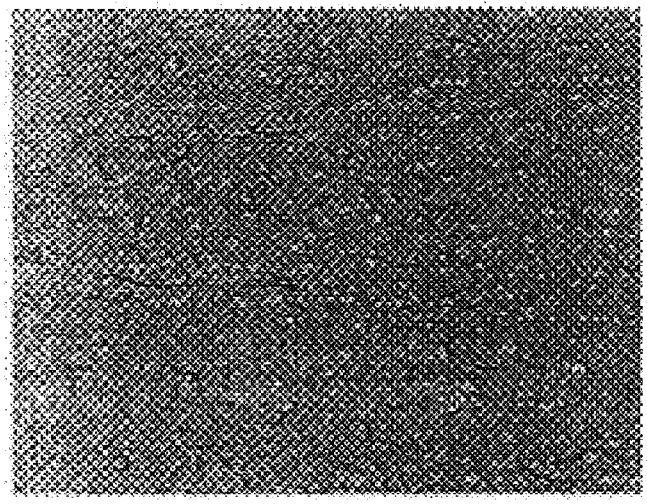
Figure 3C:

FIG. 3a shows surface microstructure of AZO vapor-deposited at 550° C. without hydrogen heat-treatment. On the other hand, FIG. 3b shows pores between surface grains for the case of AZO heat-treated at 600° C. for 3 minutes under hydrogen atmosphere. FIG. 3c represents the case of heat-treatment at 750° C. for 10 minutes, where the thin film appears to disrupt over a large number of portions.

Figure 3D:

FIG. 3d represents the case of heat-treatment at 800° C. for 3 minutes where even the intact portions of thin film remaining in FIG. 3c are found to disrupt.

As shown by the surface micropictures, hydrogen reacts chemically with small particles existing in the valleys between grains, leaving only large particles, and the particles appear to disrupt as reduction by hydrogen progresses.

As described above, thin film phosphor having new luminescence peaks can be fabricated by quick heat-treatment of zinc compound semiconductor under hydrogen atmosphere according to the present invention. This thin film phosphor can replace the conventional blue luminescence using alloy-type ZnO and furthermore can be utilized as blue light emitting material for flat plate display elements such as FED and PDP.

Although the present invention has been described and illustrated in connection with the specific embodiments, it will be apparent for those skilled in the art that various modifications and changes may be made without departing from the idea of the present invention set forth in this description.

What is claimed is:

1. A method for fabricating blue light emitting ZnO thin film phosphor comprising;

loading a substrate that is vapor-deposited with dopant-added zinc oxide thin film into a heat-treatment chamber, and performing a quick heat-treatment under gas atmosphere.

2. A method for fabricating blue light emitting ZnO thin film phosphor of claim 1 wherein said substrate is composed of silicon or sapphire single crystal.

3. A method for fabricating blue light emitting ZnO thin film phosphor of claim 1 wherein said zinc oxide thin film is fabricated by using an RF magnetron sputtering method which uses zinc oxide, doped with aluminum oxide at a weight content of 1 to 3% as a target.

4. A method for fabricating blue light emitting ZnO thin film phosphor of claim 1 wherein the temperature in said heat-treatment chamber is increased at a rate of 1 to 100° C. per second.

5. A method for fabrication blue light emitting ZnO thin film phosphor of claim 4 wherein the temperature in said heat-treatment chamber is maintained at the temperature range of 600 to 1000° C. for 3 seconds to 20 minutes.

6. A method for fabricating blue light emitting ZnO thin film phosphor of claim 1 wherein said gas is hydrogen.

7. A method for fabricating blue light emitting ZnO thin film phosphor of claim 1 wherein said dopant is composed of one or more from the group consisting of aluminum, indium, and gallium.

8. A method for fabricating blue light emitting ZnO thin film phosphor of claim 1 wherein the temperature in said heat-treatment chamber is maintained at the temperature range of 600 to 1000° C. for 3 seconds to 20 minutes.

* * * * *